United States Patent [19]

Fauchet

[11] Patent Number: 4,768,908

[45] Date of Patent: Sep. 6, 1988

[54] SELF-LOCKING SCREW - NUT ASSEMBLY

[75] Inventor: Christian R. Fauchet, Cormeilles en Parisis, France

[73] Assignee: Etablissements Saint-Chamond-Granat, France

[21] Appl. No.: 946,753

[22] Filed: Dec. 29, 1986

[51] Int. Cl.⁴ .............................................. F16B 39/12
[52] U.S. Cl. ..................................... 411/283; 29/517; 29/525.1; 411/361
[58] Field of Search ........ 411/311, 310, 167, 333–336, 411/281–284, 1–3, 360, 361; 10/152 R, 153; 29/517, 526 R; 403/284

[56] References Cited

U.S. PATENT DOCUMENTS

| | | | |
|---|---|---|---|
| 225,121 | 3/1880 | Hackman et al. | 411/336 |
| 891,990 | 6/1908 | Henry et al. | 411/336 |
| 2,355,253 | 8/1944 | Whitfield | 411/283 |
| 2,653,641 | 9/1953 | Wellman | 411/282 |
| 3,055,100 | 9/1962 | Kimpel | 411/360 X |
| 3,163,872 | 1/1965 | Rosan et al. | 10/152 R |
| 3,426,820 | 2/1969 | Phipard | 411/310 |
| 3,560,124 | 2/1971 | Bergere | 411/361 |
| 3,750,732 | 8/1973 | Moebius | 411/336 |
| 4,260,005 | 4/1981 | Stencel | 411/281 X |
| 4,544,312 | 10/1985 | Stencel | 411/167 X |
| 4,601,623 | 7/1986 | Wallace | 411/8 X |

FOREIGN PATENT DOCUMENTS

| | | | |
|---|---|---|---|
| 2454556 | 12/1980 | France | 411/336 |
| 9563 | of 1904 | United Kingdom | 411/283 |
| 664264 | 1/1952 | United Kingdom | 411/283 |

Primary Examiner—Lloyd A. Gall
Attorney, Agent, or Firm—Schiller, Pandiscio & Kusmer

[57] ABSTRACT

A self-locking screw-nut assembly is provided characterized in that the screw (2) has one or more median threads (4) of reduced diameter, whereas the nut (1) is designed to be deformed locally by an external action at the level of these reduced diameter threads after tightening to the desired torque, so that the displaced metal fills the gap (7) left free between the inner thread of the nut (1) and said reduced diameter threads (4) of the screw (2).

3 Claims, 1 Drawing Sheet

SELF-LOCKING SCREW - NUT ASSEMBLY

FIELD OF THE INVENTION

The present invention relates to a self-locking screw-nut assembly, namely a fixing assembly having a torque resisting unscrewing.

BACKGROUND OF THE INVENTION

Self-locking fixing systems known at present are generally based on a permanent radial deformation of the nut before mounting, which produces a torque resisting unscrewing by friction on the thread of the screw. Such systems have however drawbacks.

In fact, the friction is manifested during tightening and causes a resistant torque which introduces a considerable dispersion factor in the relationship between the mounting torque and the effective tension in the assembly. Moreover, the locking torque against unscrewing drops under the action of the first tightening, so that in order to guarantee a sufficient locking torque in service, it is necessary to attain a level of deformation of the nut which induces a relatively high torque resisting tightening.

It will finally be noted that, to the extent that there is no veritable locking of the nut on the screw, possible unscrewing during service, for example under the action of heavy vibrations, may not be completely impossible.

SUMMARY OF THE INVENTION

The main purpose of the present invention is then to overcome these drawbacks and, for this, it provides a screw-nut assembly which is essentially characterized in that the screw has one or more median threads of reduced diameter, whereas the nut is designed so as to be deformed locally by an external action at the level of these threads of reduced diameter after tightening to the desired torque, so that the displaced metal fills the gap left free between the inner thread of the nut and the threads of reduced diameter of the screw.

With this arrangement, the nut may be freely mounted on the screw, so with a well defined tightening torque, and its subsequent local deformation causes locking of the nut on the screw making the system truly self-locking without the action of a high torque appreciably greater than the tightening torque.

In a particular embodiment of the invention, the nut includes an external protuberance whose compression by means of an appropriate tool causes the displacement of metal required at the level of the threads of reduced diameter of the screw.

Preferably, the screw is formed by laminating a piece provided beforehand with an annular groove.

Thus, the lamination operation causes, at the level of the annular groove, the formation of a thread incompletely filled at its apex and which is therefore of reduced diameter with respect to the other threads formed.

BRIEF DESCRIPTION OF THE DRAWINGS

Several embodiments of the invention are described hereafter by way of example with reference to the accompanying drawings in which.

DESCRIPTION OF THE PREFERRED EMBODIMENT

Figure 1:
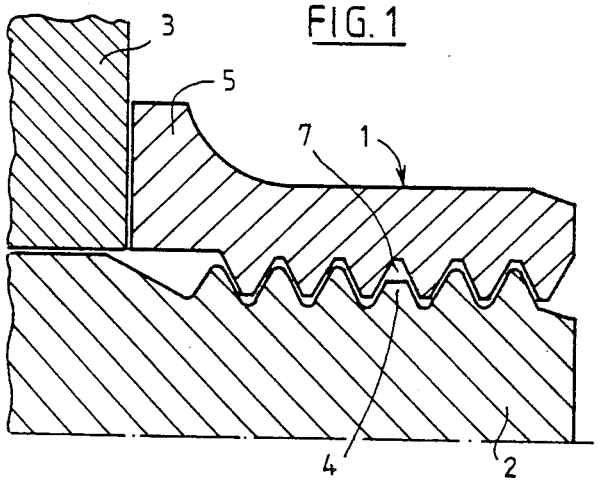
FIG. 1 is an axial sectional view of a screw-nut assembly of the invention in the assembled position.

Referring first of all to FIG. 1, a nut 1 is shown mounted on a screw 2 for maintaining in position a part 3 to be assembled. According to the invention, screw 2 is provided at 4 with a median thread whose diameter at the apex is substantially less than that of the other threads situated on each side.

Figure 2:
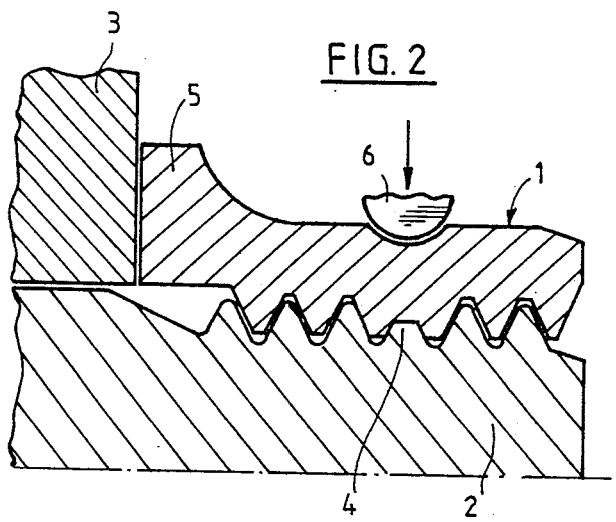
FIG. 2 shows the same assembly after locking of the nut on the screw.

Nut 1 may thus be freely mounted on screw 2, until its base 5 comes into contact with the piece 3 to be assembled. After tightening the nut to the desired torque, an appropriate tool, possibly formed by the tightening tool itself causes, for example by means of a ball such as 6, a local plastic deformation of the external surface of the nut at the level of the reduced diameter thread 4 of screw 2. Thus, the displaced metal fills the gap 7 left free between the inner thread of the nut and the reduced diameter thread of the screw, as illustrated in FIG. 2. The nut is thus perfectly locked on the screw and can no longer be unscrewed without the action of a high torque, capable of causing the metal of the nut to come back to its initial position under the effect of the increase in diameter of the thread.

Figure 3:
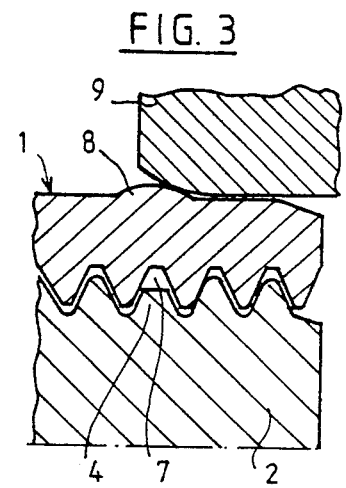
FIGS. 3 and 4 are views similar to FIGS. 1 and 2 of a variant of construction of the invention.
Figure 4:
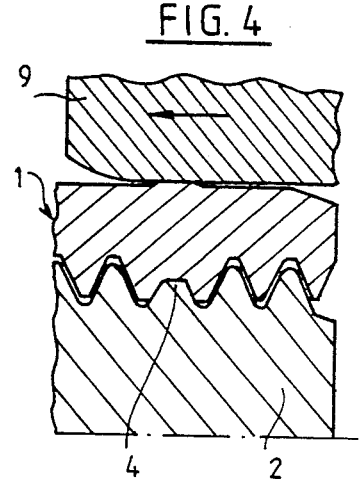

In the embodiment shown in FIGS. 3 and 4, nut 1 is provided with an external protuberance 8, whose compression by means of a tool 9 in the form of a die, causes, at the level of the reduced diameter thread 4, the necessary displacement of metal for locking the nut on the screw.

The median thread or threads of reduced diameter may naturally be obtained by machining with a tool cutting the top of the threads in the adequate zone of the screw.

Figure 5:
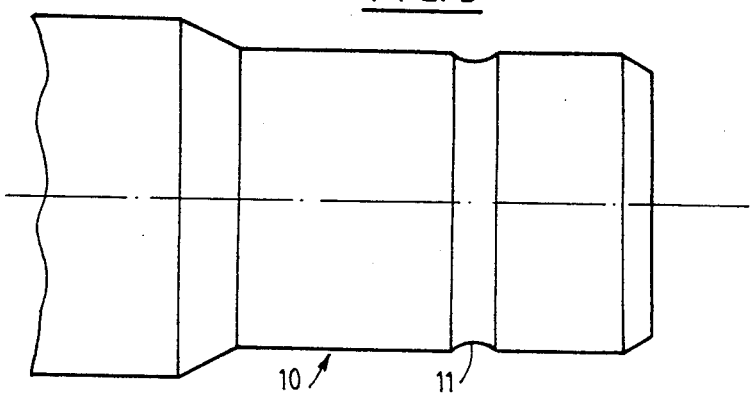
FIG. 5 illustrates one method of manufacturing the screw of the invention.

Even more economically, a reduced diameter thread may be obtained directly during manufacture of the screw by the rolling process or lamination. To this end, and as shown in FIG. 5, a blank is used such as 10 which is previously provided with an annular groove 11. The lamination operation causes, at the level of this annular groove 11, the formation of a thread incompletely filled at its apex because of the smaller volume of metal to be displaced, whereas the other threads situated on each side have a greater diameter at the apex because of complete filling of the rolling tool.

I claim:

1. A self-locking screw-nut assembly comprising a screw and a nut, characterized in that the screw (2) has at least one median thread (4) of reduced diameter extending completely around said screw, and the nut (1) is designed to be deformed locally by an external action at the position of said reduced diameter thread after tightening the nut on the screw to the desired torque, so that the displaced metal fills the gap (7) left free between the inner thread of the nut and said reduced diameter thread (4) of the screw (2).

2. The screw-nut assembly according to claim 1, characterized in that the nut (1) has an external protuberance (8) whose compression by means of an appropriate tool (9) causes the required displacement of metal at the level of the reduced diameter thread (4) of the screw (2).

3. The screw-nut assembly according to claim 1 or 2, characterized in that the screw (2) is formed by lamination of a piece (10) provided previously with an annular groove (11).

* * * * *